G. & C. A. KUNZ.
BRAKE.
APPLICATION FILED JAN. 27, 1910.

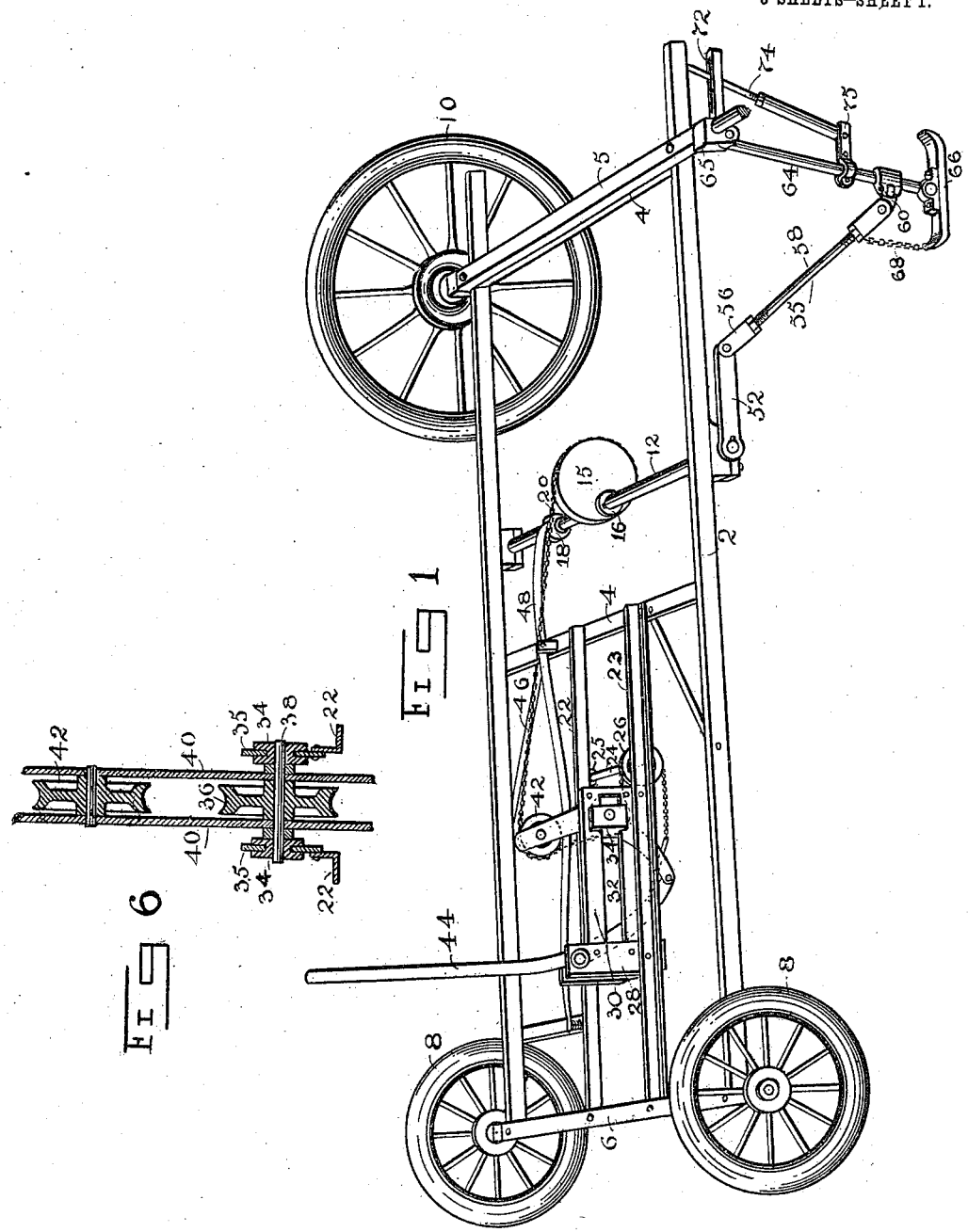

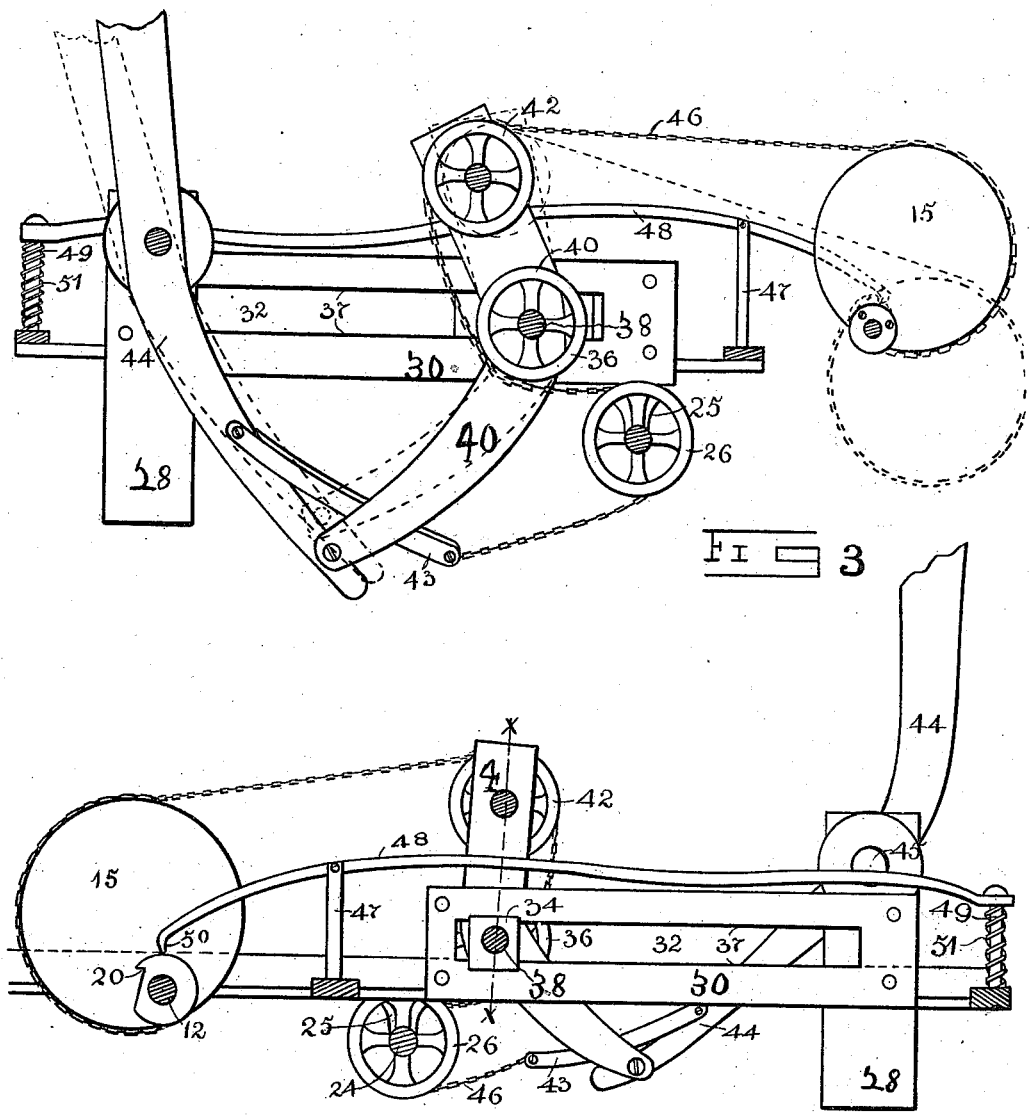

976,083.

Patented Nov. 15, 1910.

3 SHEETS—SHEET 3.

Witnesses
E. M. Noonan.
J. H. Hanapel

Inventors
George Kunz
Charles A Kunz
By M. M. Cady.
Attorney

UNITED STATES PATENT OFFICE.

GEORGE KUNZ AND CHARLES A. KUNZ, OF DUBUQUE, IOWA.

BRAKE.

976,083.  Specification of Letters Patent.  Patented Nov. 15, 1910.

Application filed January 27, 1910.  Serial No. 540,430.

*To all whom it may concern:*

Be it known that we, GEORGE KUNZ and CHARLES A. KUNZ, citizens of the United States, residing at 1208 Lincoln avenue, in the city and county of Dubuque and State of Iowa, have invented certain new and useful Improvements in Brakes, of which the following is a specification.

Our invention relates to brakes for automobiles with special reference to emergency brakes, and one of the objects is to provide a brake for the car which shall not only serve to quickly stop the car, but will not permit the wheels of the car to contact with the brakes or anything whereby they might be injured and further will prevent any undue strain upon other parts of the car when suddenly brought to a standstill.

It consists in means for raising the rear wheels of the car from contact with the ground and holding them free to rotate without contact with anything.

It further, consists in special means for operating the brake, whereby the operating lever will not be moved but a short distance, and will not interfere with the usual brake of the car, or with any of its means for operating the car.

These with other features of the invention will be fully set out in the following specification when read in connection with the drawings accompanying the same and forming a part hereof.

Figure 5:
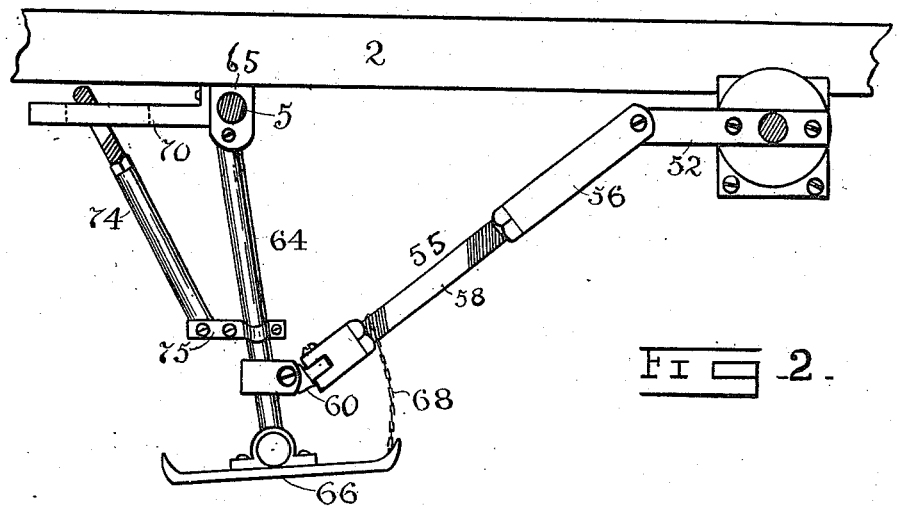
Figure 2:
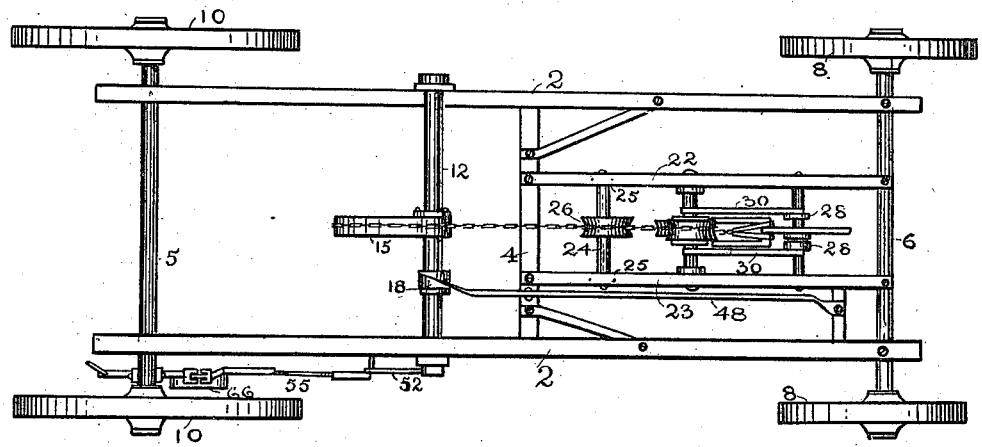

Figure 1 is partly a side and partly a top view of one of the braking devices as attached to a car with the brake down. Fig. 2 is a top view of the car with one of the braking devices attached. Fig. 3 is view of one side of the device for operating the brake. Fig. 4 is the opposite side of Fig. 3. Fig. 5 is a side view of the brake, its attachments and part of the frame of the car. Fig. 6 is a vertical section through line $x$—$x$ of Fig. 3.

Like characters of reference denote corresponding parts in each of the figures.

Referring to the drawings 2 designates the side bars which with the cross bars 4 constitute the bed or frame of the car and to which the axles 5 and 6 are attached and carried by the wheels 8 and 10. Near the middle of the side bars 2 against their lower sides is journaled a shaft 12, upon which is rigidly secured a cam wheel 15 by the hub 16. Upon the same shaft is also rigidly fixed another wheel 18 provided with a notch 20.

To the cross bars 4 are attached bars 22 and 23 and to the under side of these bars is journaled a shaft 24 in hangers 25, on which is mounted a wheel 26. Against each one of the side bars 22 and 23 are fastened upright posts 28 to which are secured plates 30, one on each side. These plates are each provided with a slot 32 in which are slides 34. The slides are provided with a groove 35 in each of their opposite edges, in which the inner edges 37 around the slots engage and guide the slides. In the slides 34 is journaled a shaft 38 which also passes through two uprights 40, and between these uprights and on the shaft 38 is mounted a wheel 36. Between the uprights 40 near their top and over the wheel 36 is mounted another wheel 42. The two uprights 40 are bent or curved forward, and between them is pivoted the operating lever 44. The lever is also pivoted or mounted on a journal 45 that is pivoted between the uprights 28 at their forward ends. To the lower end of the lever 44 is attached links 43 and between these links is secured a chain 46 which passes under the wheel 26 and around it and under the wheel 36, and up over the top of the wheel 42, and then over and partly around the cam wheel 15 and is secured in the cam wheel 15 near the shaft 12. On the cross bars is set a post 47 to the top of which is pivoted a lever 48, which said lever is provided with a hook 50 adapted to engage the notch 20 and hold the wheel 18 in a given position with the brakes folded up. The outer end of the lever 48 is provided with an opening through which a post 49 projects. Around the post is coiled a spring 51 that is adapted to keep the hook 50 in engagement with the notch 20. To the outer ends of the shaft 12 are secured crank arms 52 by washers, and to the outer ends of these crank arms are pivoted the brake arms 55. These brake arms 55 are each composed of a tube 56 screw threaded on its inner side into which is screwed a bar 58, the lower ends of which are attached to the collars 62 secured to the arms 64 by a universal joint 60. By this mode of constructing the arms 55 they become adjustable longitudinally.

Around one of the axles 5 are secured collars 65 to which the arms 64 are pivotally attached. The brake shoes 66 are pivotally secured to the arms 64 and are controlled in their movements by chains 68 loosely secured to the forward ends of the shoes and to the bars 58. The shoes are flat with the ends slightly turned up. The object of this construction is to present a long surface to the ground and thus, when the weight of the rear end of the car is thrown upon them, the large surface for frictional engagement with the ground will brake the car very quickly and without any serious strain on any part of the car.

Against one side of the collars 65 are fastened plates 70 provided with slots 72 through which an arm 74 projects. The arms 74 are loosely secured in collars 75 attached to the arms 64.

In operating our device if we start with the brake shoes folded up under the frame, the operator places his foot upon the lever 48 near the end where the post 49 passes through the lever and by pressing down on this lever the hook 50 will be drawn out of engagement with the notch 20. As soon as the cam wheel 15 is released by the disengagement of the hook 50 from the notch 20, the brakes being fixed upon the shaft 12 will fall down to the ground by their own gravity and as they come down they will draw down the plate 52 and rotate the shaft 12, which will rotate the cam 15, and wind up the chain 46, which will draw the handle of the lever 44 forward on its pivot 45. At the same time the brakes drop to the ground, the arm 64 being longer than the distance from the frame to the ground, the wheels 8 will be lifted off from the ground and will be free to rotate on their axles 5. In order to prevent the rear axle from partially rotating whereby the springs of the car might be loosened from the axle and the body of the car strained, the arm 74 will engage the under side of the side bars 2 and aid to hold the car with the wheels free to turn. It will now be noticed that the wheels are off the ground but in no manner in contact with the brake shoes or any other part of the auto and are free to turn, hence there will be no wear whatever upon the tires, caused by suddenly braking the movement of the car. This is a special feature in our invention and causes a great saving in tires. It will also be noticed that when the chain 46 is drawn up taut by the rotation of the shaft 12 in the dropping of the brake shoes to the ground that the slides 34 will have been brought to the rear end of the slots 32, and the lever 44 drawn toward the front end of the car. When the operator desires to raise the brakes and fasten them under the car he pulls the lever 44 toward himself and this movement forces the slides 34 along forward in the slots 32, toward the other end of the slots, and this rotates the cam 15 until the hook 50 comes into engagement with the notch 20 by the operation of the coil spring 51 and prevents any further rotation of the shaft 12. It will be seen that there will be only a slight movement of the lever 44 from the fact that the slides 34 take up the slack of the chain and thus necessitate only a short movement of the lever 44, and the lever 44 will not be in a position or forced through a space that will interfere with any other of the operating devices of the car, and will also aid in quickly operating the brakes. It will be further observed that by the mode of construction with long brake shoes pivoted near their centers and controlled in their pivotal movement by the chain, that they will adapt themselves to the ground and will carry the car without contact with the wheels and prevent any undue strain on the body of the car when it is suddenly stopped.

Having now described our invention what we claim and desire to secure by Letters Patent is:—

1. In a device of the class described, a frame, a shaft journaled to the frame, brake shoes connected to the shaft, a cam on said shaft, a wheel on said shaft, means including a hook adapted to engage the wheel on the shaft for holding the brakes out of engagement with the ground, means for releasing the brakes to cause them to engage the ground to raise the hind wheels off from the ground and permit the wheels to freely rotate upon their axis without contact with the brakes, and means connected with the cam for raising the brakes out of contact with the ground.

2. In a device of the class described, a frame, a shaft journaled to the frame, a cam secured to the shaft, brakes secured to the shaft, a lever, connections between the lever and the cam on the shaft for operating the cam to raise the brakes, a wheel mounted upon the shaft, a lever adapted to engage the wheel and prevent the rotating of the shaft to hold the brakes in their raised position, and means for releasing the brakes to cause them to engage the ground and lift the hind wheels of the car from the ground and permit said wheels to freely rotate without contact with the brakes.

3. In a device of the class described, a frame, a shaft journaled to the frame, a cam on the shaft, brake shoes, connections between the brake shoes and the shaft, a lever, a cable secured to the cam and connected to the lever for rotating the cam to raise the brakes, and means engaging the cable interposed between the lever and cam for taking up the slack of the cable when the brakes are raised.

4. In a device of the class described, a frame, a shaft journaled to the frame, a wheel mounted on the shaft and provided with a notch, crank arms secured to the ends of the shaft, brake arms pivoted to the crank arms, brake shoes, flexible connections between the ends of the shoes and the brake arms, means connected with the shaft for operating the brakes to raise the rear wheels of the car out of contact with the ground, and means engaging the wheel on the shaft for holding the brakes in their elevated position.

5. In a device of the class described, a frame, a shaft journaled to the frame, a cam on the shaft, a lever pivoted to the frame, connections between the cam and the lever, plates secured in the frame and provided with slots, slides carrying a wheel and connected to the lever, and adapted to slide in the slots in the plates, and connection between the cam, the wheel and lever for rotating the cam to raise the brakes and operate the slides.

6. In a device of the class described, a frame, a shaft journaled to the frame, a cam on the shaft, brakes, a lever, a wheel carried by a slide, and a cable connecting the cam with the lever and engaging the wheel carried by the slide for taking up the slack in the cable when the lever is moved a limited distance in rotating the cam to raise the brakes.

7. In a device of the class described, a frame, a shaft journaled to the frame, a cam on the shaft, brake shoes, connections between the brake shoes and shaft, a lever, a cable secured to the cam and connected to the lever for raising the brakes from contact with the ground, in combination with a wheel provided with a notch, a lever, a hook on the lever adapted to engage the notch in the wheel and hold the brakes in an elevated position after they have been brought up by the rotation of the shaft.

8. In a device of the class described, a frame, a shaft journaled to the frame, a cam on the shaft, brake shoes, connections between the brake shoes and shaft, a lever, a slide, a wheel journaled in the slide, a second wheel movable with the slide, a third wheel pivoted in the frame and a cable connecting the cam and the lever and engaging the three wheels to take up the slack in the cable and limit the movement of the lever, when the lever is operated to raise the brakes.

9. In a device of the class described, a frame, a shaft journaled to the frame, a cam on the shaft, brake shoes, connections between the brake shoes and shaft, a lever, a slide, a wheel journaled in the slide, a second wheel movable with the slide, a third wheel pivoted in the frame, and a cable connecting the cam and the lever engaging the three wheels to take up the slack in the cable and limit the movement of the lever when the lever is operated to raise the brakes, in combination with a wheel provided with a notch, and a lever adapted to engage the notch in the wheel and hold up the brakes when they have been brought up by the operating lever.

10. In a device of the class described, a frame, a shaft journaled to the frame, brake shoes, connections between the brake shoes and shaft, a cam on the shaft, a lever, a cable connecting the cam and the lever, and three wheels interposed between the cam and the lever, and controlled by the lever and cable to raise the brakes.

11. In a device of the class described, a frame, a shaft journaled to the frame, a lever, connections including a cable between the lever and the shaft, arms suspended from the rear axle of the car, brake shoes pivoted to the arms, arms 74 adapted to engage the under side of the frame of the car and means secured to the shaft and connected with the brake shoes for controlling their movements.

12. In a device of the class described, a frame, a shaft journaled to the frame, brake shoes, connections between the brake shoes and shaft, an arm attached to the rear axle of the car, with brake shoes pivoted to the base of said arm, means connected to the shaft for controlling the movement of the brakes, and an arm 74 adapted to engage the underside of the frame when the brakes are brought in contact with the ground and the rear wheels are raised off from the ground.

In testimony whereof we affix our signatures in presence of two witnesses.

GEORGE KUNZ.
CHARLES A. KUNZ.

Witnesses:
M. M. CADY,
E. M. NOONAN.